Figure 1:
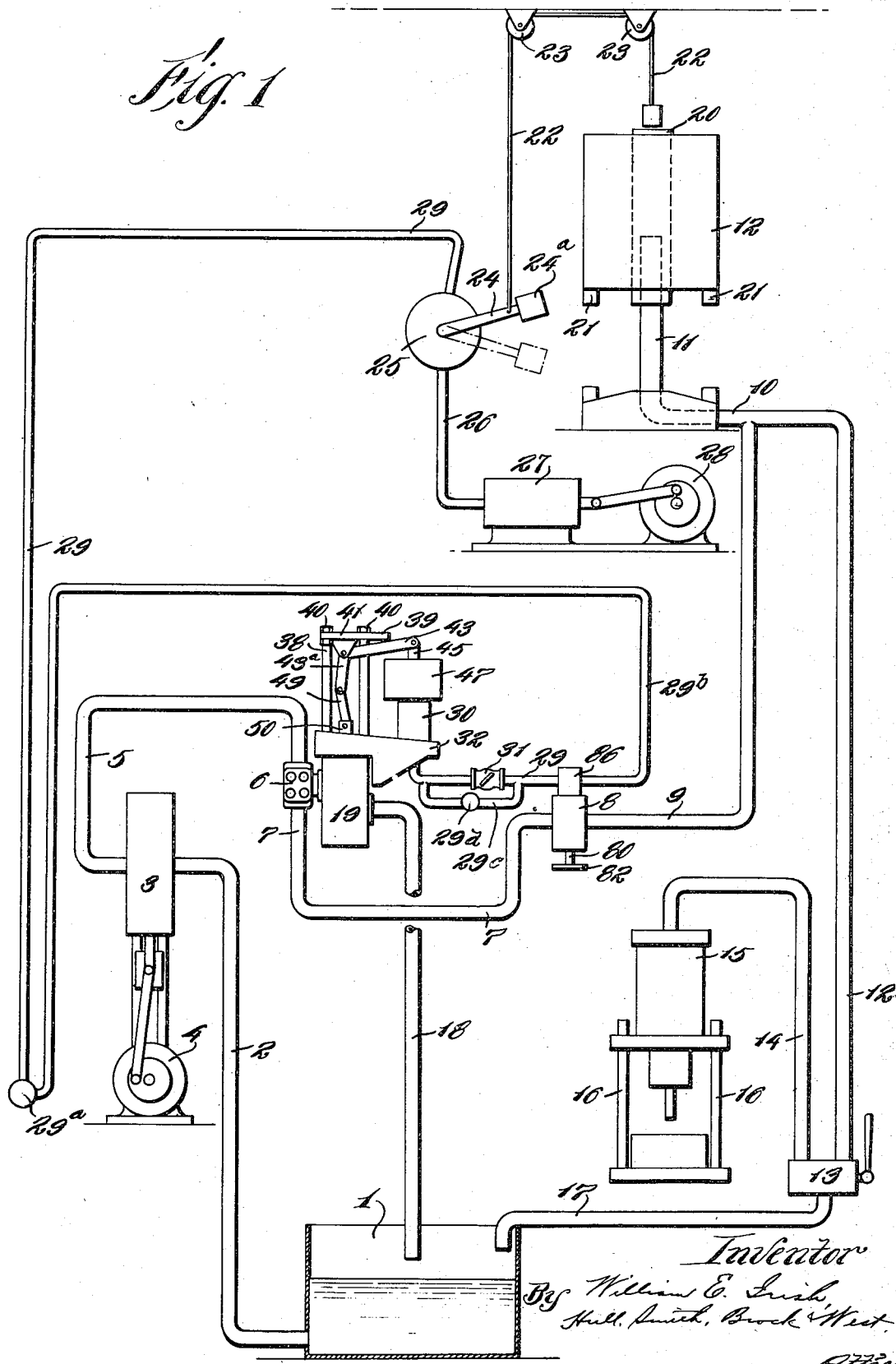

Apr. 3, 1923.

W. E. IRISH.
FLUID PRESSURE SYSTEM.
FILED APR. 16, 1919.

1,450,372.

5 SHEETS—SHEET 1.

Inventor
William E. Irish,
By Hull, Smith, Brock & West
Attys.

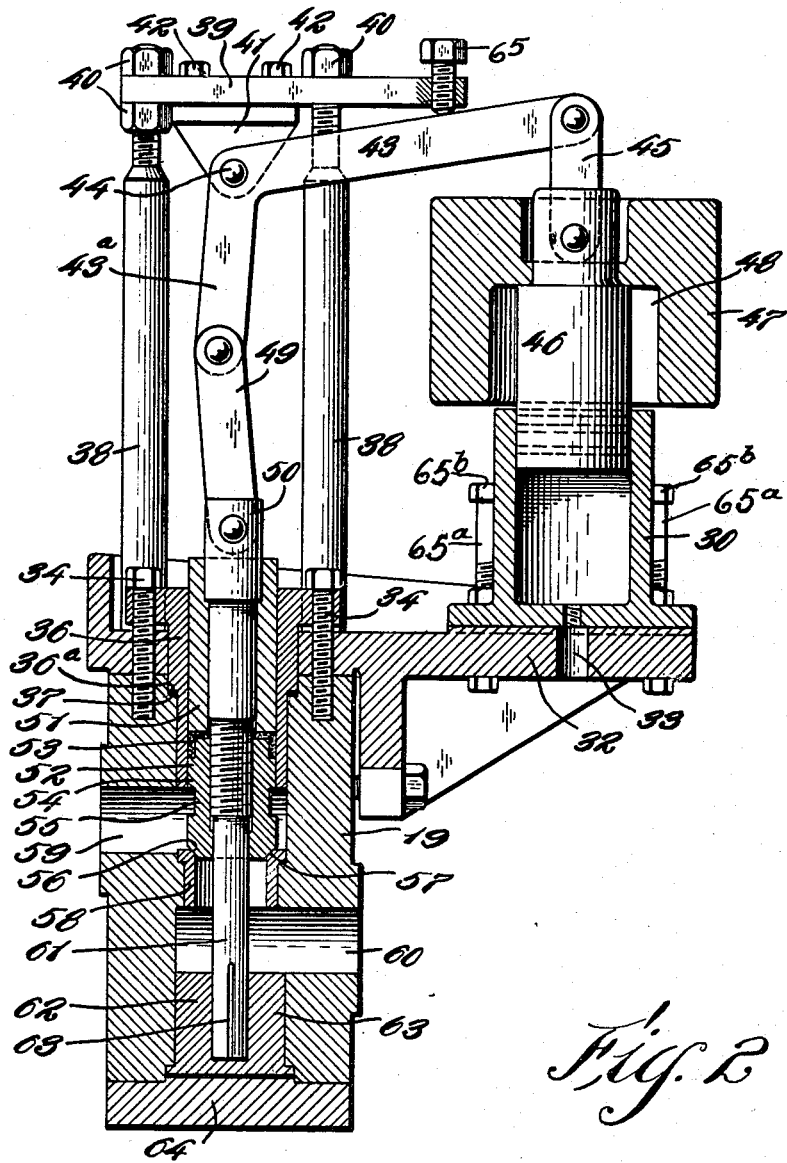

Apr. 3, 1923.
W. E. IRISH.
FLUID PRESSURE SYSTEM.
FILED APR. 16, 1919.
1,450,372.
5 SHEETS—SHEET 3.
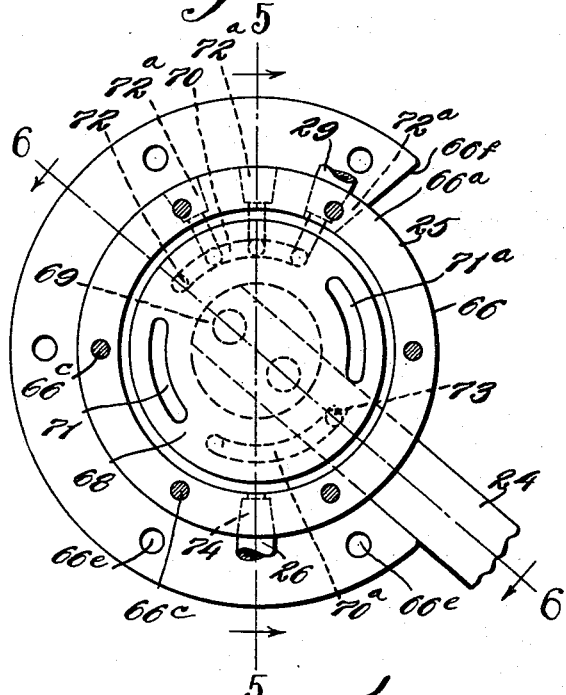
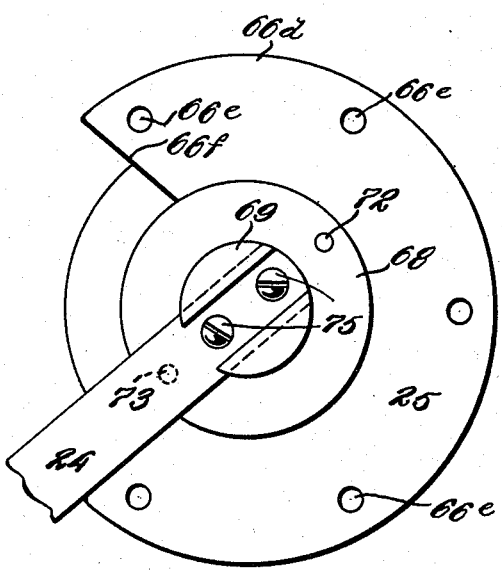
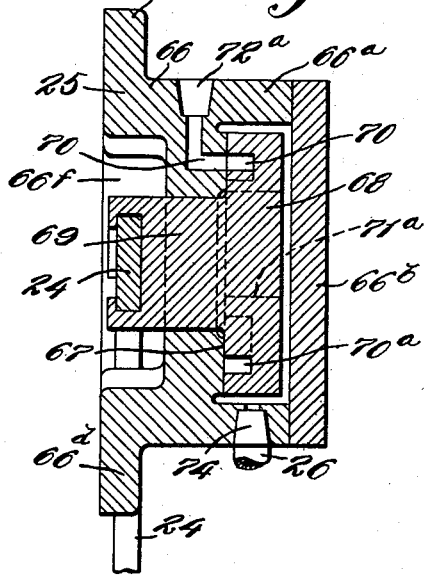
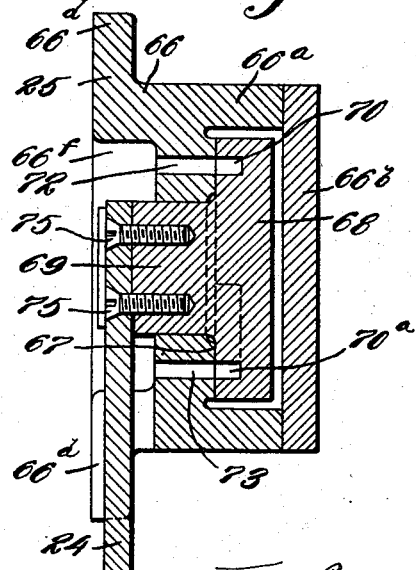
Inventor
William E. Irish,
By Hall, Smith, Brock & West,
Attys.

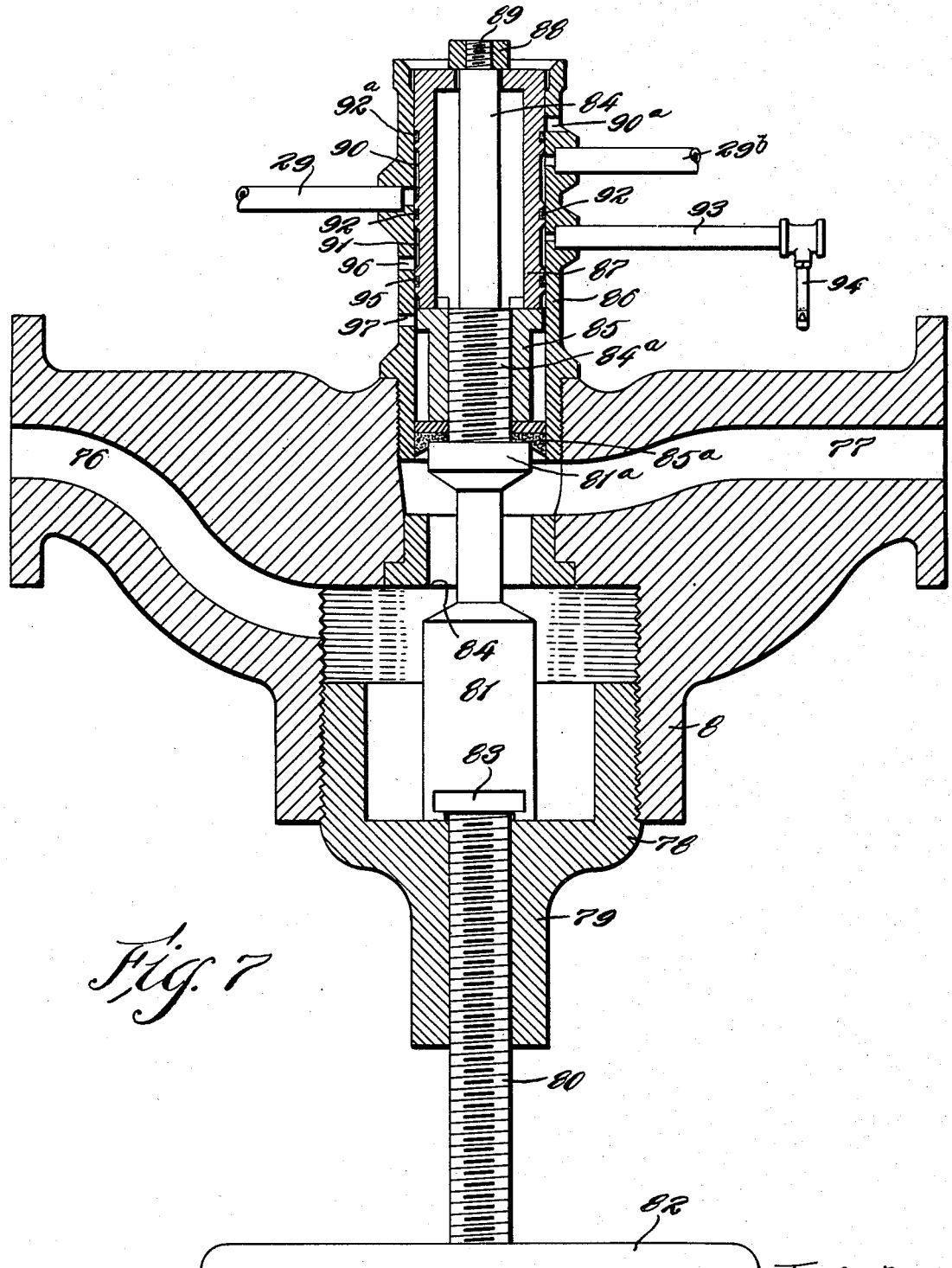

Apr. 3, 1923.
W. E. IRISH.
FLUID PRESSURE SYSTEM.
FILED APR. 16, 1919.
1,450,372.
5 SHEETS—SHEET 5.
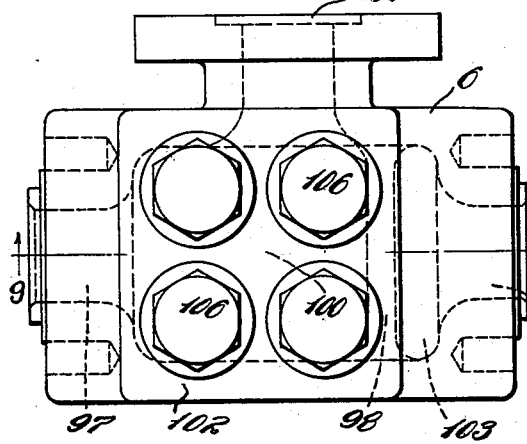
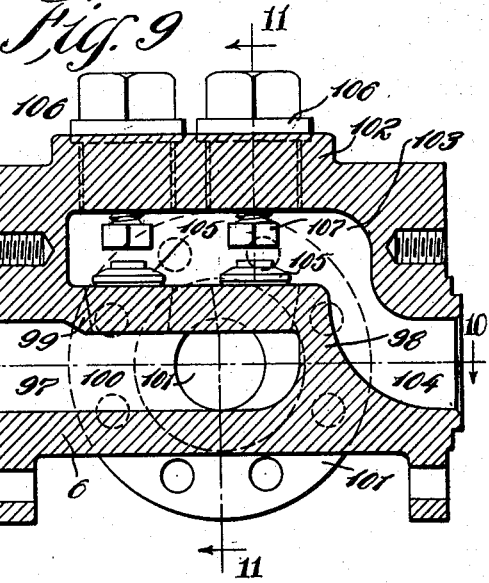
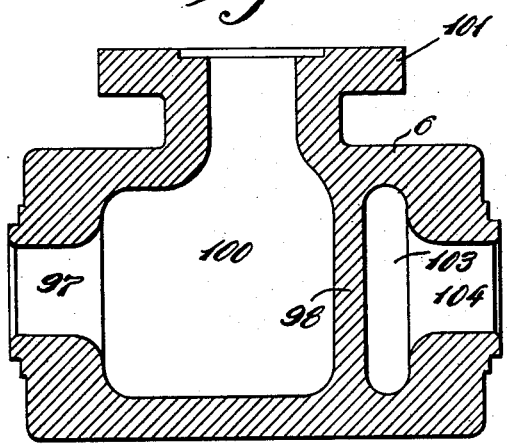
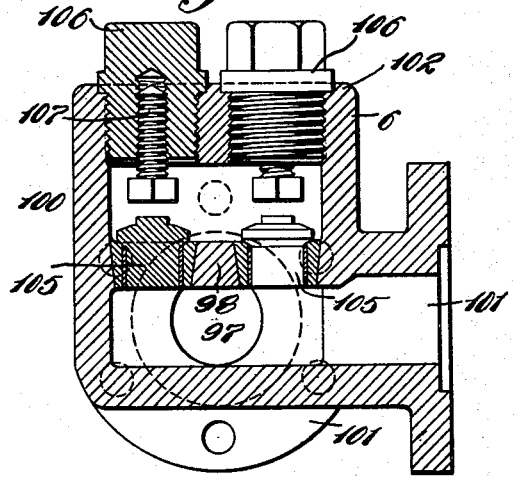
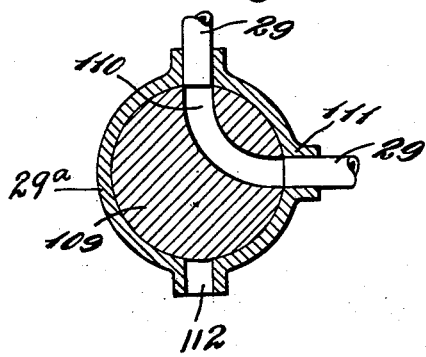

Patented Apr. 3, 1923.

1,450,372

UNITED STATES PATENT OFFICE.

WILLIAM E. IRISH, OF CLEVELAND, OHIO, ASSIGNOR TO THE HYDRAULIC PRESSED STEEL COMPANY, OF CLEVELAND, OHIO, A CORPORATION OF OHIO.

FLUID-PRESSURE SYSTEM.

Application filed April 16, 1919. Serial No. 290,621.

*To all whom it may concern:*

Be it known that I, WILLIAM E. IRISH, a citizen of the United States, residing at Cleveland, in the county of Cuyahoga and State of Ohio, have invented a certain new and useful Improvement in Fluid-Pressure Systems, of which the following is a full, clear, and exact description, reference being had to the accompanying drawings.

This invention relates to hydraulic systems for operating presses and similar apparatus and has for its general object to increase the efficiency and safety of such systems; to simplify the construction thereof; and to render the same positive and reliable in operation. Further and more limited objects of the invention will appear hereinafter and will be realized in and though the combinations of elements embodied in the claims hereof.

In the drawings forming part hereof, Fig. 1 represents a diagrammatic view of the system; Fig. 2 a sectional elevation of the unloader; Fig. 3 a detail in front elevation, and Fig. 4 a detail in rear elevation, of the air control; Figs. 5 and 6 details corresponding respectively to the lines 5—5 and 6—6 of Fig. 3; Fig. 7 a sectional view of a manual control valve; Fig. 8 a top plan view of the unloader supply valve mechanism and Fig. 9 a sectional view corresponding to the line 9—9 of Fig. 8; Figs. 10 and 11 sectional views corresponding respectively to the lines 10—10 and 11—11 of Fig. 9; and Fig. 12 a sectional view of the valve in the air supply line leading to the unloader.

The system comprises generally a tank from which a liquid, as water, is pumped through a conduit and a press-operating valve to one or more hydraulic presses. Between the pump and the press-operating valve is an unloader valve by means of which the liquid, under conditions to be pointed out hereinafter, may be discharged to waste into the supply tank. Interposed between the press-operating valve and the unloader is an accumulator which is adapted to receive surplus water due to pressure in the conduit, thereby to operate the air control valve and permit compressed air, from a suitable pump and compressor, to open the unloader valve thereby to shut off the supply of water to the presses and direct the water to the supply tank.

In the drawings, the tank for the water is indicated at 1 and is connected by a pipe 2 to the cylinder 3 of a pump which may be driven by a motor 4. From the pump cylinder a pipe 5 extends to a casing 6, and from this casing a pipe 7 extends to the casing 8 of a manually operated valve which will be described hereinafter. From this valve casing a pipe 9 extends to and is connected with a pipe 10, one branch 11 whereof extends to the accumulator, indicated at 12, the main part of the pipe 10 extending to the ordinary press-operating valve 13. From this valve a pipe 14 extends to the cylinder 15 of a press, indicated generally at 16. A second pipe 17 extends from the press-operating valve to the reservoir 1, as does a waste pipe 18 leading from the casing 19 of the unloader valve, said casing being connected with the middle branch of the casing 6.

The accumulator comprises a casing which may be loaded by any heavy material, as iron ore. Within this casing and connected thereto is a cylinder 20 which is slidable upon the upper end of the pipe 11. This accumulator, when the liquid supply to the presses is normal, is supported upon a bed or platform 21 and is connected by means of a rope or similar flexible connection 22, extending over pulleys 23, with the operating handle 24 of the air control valve 25, the said handle being weighted, as indicated at 24ᵃ. This valve is interposed in a conduit for compressed air, one branch 26 of said conduit extending from a compressor pump 27, operated by a motor 28, to the casing of the valve and the other branch 29 of said conduit extending from the said casing through a two-way valve casing 29ᵃ adjacent to the pump 4, to the upper end of the valve casing 8, and thence to the bottom of the unloader cylinder 30 and being provided with a check valve 31.

*Unloader mechanism.*

This mechanism is shown in detail in Fig. 2, wherein 32 denotes a supporting base for the valve casing and for the unloader cylinder 30, being provided with a bore 33 for the pipe 29. The valve casing 19 is secured to the supporting base by means of the standards 38 shouldered onto the base and threaded into the casing. Within the casing is a guide bushing 36 having a shoulder 36$^a$ bearing against a leather packing ring 37 and forced against said ring by bolts 34. The upper ends of the standards 38 are shown as reduced and threaded, and the plate 39 is secured thereto as by means of nuts 40. Between the standards 38 a bracket 41 is interposed, said bracket being secured to the plate 39 as by means of bolts and nuts, the latter being indicated at 42.

An angle lever 43 is pivotally connected to the bracket 41, as indicated at 44. One end of this angle lever is connected by a double link 45 with the upper end of the unloader piston 46, the said piston being provided with a weight 47 which is recessed, as indicated at 48, in order to receive therewithin and between the same and the piston 46 the upper end of the cylinder 30. The other arm 43$^a$ of the angle lever is connected by a double link 49 with a stem 50 having pressed thereon a sleeve 51, the lower end of the stem being reduced and threaded into the valve 52, there being a gasket 53 interposed between the valve 52 and the sleeve 51. The valve is provided with an annular rib or projection 54 fitting within the lower end of the bushing 36 and with a recess 55 below said rib or projection. The lower end of the valve 52 is provided with a beveled seating portion 56 cooperating with a correspondingly beveled seat 57 on a valve bushing 58 mounted within the bore of the valve casing.

The valve casing 19 is provided with a lateral port 59 with which the central branch of the valve casing 6 communicates and with a lateral port 60 below the valve 52 and valve bushing 58 and communicating with the central bore of the casing and with the waste pipe 18. Projecting downwardly from and through the central portion of the valve 52 is a valve steadier 61 the lower end of which slides within a bushing 62. The valve steadier may be made as an extension of the valve stem and is provided with a slot 63 extending above the bushing to release any water in said bushing as the valve moves to its seat. 64 donates a bottom closure for the valve casing 19.

The parts in Fig. 2 are shown in the positions which they occupy when the valve is closed, at which time the piston 46 is elevated by pressure within the cylinder 30. Should this pressure fall, the weight of the piston will cause the latter to descend, thereby opening the valve 52 and permitting liquid supplied through the pipe 5 to escape, through the said valve and the port 60, to the waste pipe 18.

The plate 39 is extended over the arm 43 of the angle lever and is there provided with a screw 65 which may act as a stop for the piston 46. Normally this screw is not engaged by the lever arm 43, the valve 52 being seated before such engagement. This screw, however, serves to indicate the wear on the valve and its seat so that, when the lever engages the screw, it will indicate to the operator that wear has taken place and the valve and its seat may then be reground. The plate 39 may then be moved downwardly on the threaded ends of the standards to compensate for this regrinding by suitable adjustment of the nuts 40, so that the lower end of the screw 65 may again clear the lever arm 43 when the valve is seated. Should the valve and its seat become unduly worn, the screw will limit the upward movement of the arm 43 and prevent the toggle formed by 43$^a$ and 49 from passing its center and thus opening the valve.

It will be understood that the piston 46 is normally held in its elevated position, thus seating the valve 52 by air pressure supplied from the compressor 27 through the valve 25 and that the opening of the former valve is effected by diminution of this air pressure. In prior constructions with which I am familiar, the valve is opened by the pressure of liquid operating against the bottom of the valve and through small ports which are liable to clog. In the event of such clogging, the unloader will fail to operate, and the accumulator is liable to be lifted entirely off the pipe 11. By my construction and arrangement of parts, should any breakage occur in the unloader line, the system will be automatically vented or relieved through the unloader valve and the pipe 18, and the system cannot be operated to its detriment and the detriment of the plant and the workmen.

On each side of the cylinder 30 are the screws 65$^a$, these screws having heads 65$^b$, which are adapted to be engaged by the lower end of the weight 47, thereby to limit the opening movement of the valve 52.

*Air control valve.*

This valve is indicated at 25 on Fig. 1 and in detail on Figs. 3 to 6 inclusive. This valve accomplishes the same general objects as have been obtained heretofore by the employment of four complex electrically and mechanically operated mechanisms at the control board. The valve comprises generally a combined casing and base 66 having an annular seat 67 on which is mounted the rotary valve, the said rotary valve comprising a disk 68 having an enlarged stem 69 fitting within the central bore of the seat 67. The valve disk is enclosed within the valve casing by means of the cylindrical body 66ª of said casing and a cover 66ᵇ secured to the body 66ª by means of bolts 66ᶜ. The valve disk 68 is provided with opposed segmental recesses 70 and 70ª which are formed within the face of the disk which fits against the seat 67. In addition, the valve disk is provided with two segmental ports 71, 71ª, which extend entirely therethrough.

The upper recess 70, when the arm 24 is in its lowermost position, registers with a port 72 which extends through the annular valve seat 67 and with ports 72ª extending through the side wall of the casing and communicating each with the bottom of an unloader cylinder, such as 30 and a pipe as 29. When the parts are in the positions shown in Fig. 3, the accumulator has been lifted through the water supplied by the pump or pumps 4 in excess of that required for the presses, and all of the unloader valves 52 are opened by venting the air from beneath the pistons 46 through the recess 70 and ports 72, the pumps for all of the presses communicating with a common accumulator. The segmental recess 70ª registers with the port 73 and serves to admit air from the atmosphere between the valve disk 68 and its seat for the purpose of balancing the pressure of the valve upon said seat.

As the arm 24 is elevated by the lowering of the accumulator 12, the ports 72ª are progressively cut out of registration with the port 70 by the movement of the recess 70. The upward movement of the arm 24 causes the through port 71ª to progressively register with the ports 72ª, thereby allowing air supplied through the pipe 26 and the port 74 to the valve chamber formed between the casing 66ª and cover 66ᵇ to pass through the ports 72ª progressively to the bottoms of their respective unloader cylinders, thereby to seat their valves 52. The segmental port 71 is merely for the purpose of balancing the pressure, within the chamber enclosing the disk 68, upon the said valve and its seat. It will thus be seen that, by the upward movement of the arm 24, due to the lowering of the accumulator, the valve 52 in the system shown in Fig. 1 is closed by air under pressure supplied through the segmental port 71ª, one of the ports 72ª and the pipe 29 to the bottom of its cylinder 30; so also are the unloader valves for other presses or groups of presses, their cylinders being supplied with air through the said port 71ª and the other ports 72ª. It will also be seen that, as the arm 24 descends, due to the elevation of the accumulator by water in excess of that required for the presses, the air from the unloaders will be progressively vented through their lines, ports 72ª, segmental recess 70, and the venting port 72. This results in opening the various unloader valves and permitting liquid supplied by the various pumps 4 to go to waste through pipes 18.

29ᶜ denotes a pipe connected at its ends with the pipe 29 on opposite sides of the check valve 31. This pipe is provided with an ordinary needle valve, the handle of which is indicated at 29ᵈ. This valve is left slightly open whereby, when the line 29 is vented through the valve 25, air may escape slowly through said line, cushioning the descent of the piston 46.

The valve casing 66 is provided with a flange 66ᵈ by means of which it may be fastened to any supporting member, as by means of bolt holes 66ᵉ; also with a segmental slot 66ᶠ for the reception of the valve operating arm 24, the ends of the slots constituting stops to limit the throw of said arm, the said arm being connected to the central body of the valve as by means of screws 75.

In Fig. 3, the parts are shown in the positions which they occupy when the accumulator 12 has been elevated to the safe limit and the ports are so registered with the port 70 as to release the air from the various unloaders. This results in lowering the unloader pistons for the various groups of presses by permitting the air to escape from beneath the said pistons, with the result that the unloader valves are opened and the liquid from the pump for each press or group of presses is delivered through the waste pipe 18. Thus, while the air compressor will be in operation at all times, the air delivered therefrom will be inoperative to control the systems until such time as the liquid supplied by the pumps is in excess of that required by the presses, at which time the air will be relieved from the unloaders for the purpose of allowing the pumps to deliver the liquid to the tank 1.

*Line valve.*

This valve is indicated diagrammatically at 8 in Fig. 1 of the drawing and in detail in Fig. 7 and comprises the casing 8 having an inlet connection 76 with which the pipe 7 of the liquid supply conduit communicates and an outlet connection 77 which in turn communicates with the pipe 9. The lower end of the casing is provided with an extension 78 threaded thereinto and provided with an internally threaded guide projection 79 which receives the externally threaded stem 80 for the valve 81, the said stem being provided with an operating handle 82 and having a head 83 fitted within an annular recess in the valve 81. By operating the handle 82, the valve 81 may be seated at 84, thereby enabling the unloader and the water supplied to the press 15 to be shut off in the event of a breakage in the liquid system occurring beyond the line valve. The valve 81 is intended to be closed when the pump 4 is shut down for repairs to the pump or to any parts of the liquid line on the pump side of the valve 8. Closing the valve 81 also shuts off the air supply to the unloader and prevents any accidental loading up of the pump during the time when the said valve is closed. In addition to cutting off the air supply to the unloader, provision is made for sounding a warning signal in the event that the operator attempts to work the unloader when the valve 81 is closed. The valve mechanism for accomplishing these results is shown in the upper portion of Fig. 7. The valve 81 is provided with a stem 84ª threaded into a sleeve 85 within the air valve casing 86, the stem having a head 81ª between which and the sleeve 85 there is inserted packing 85ª. This sleeve is flanged at its upper end whereby it bears against a cylindrical valve 87 within the casing 86. The valve 87 is clamped between the flange on the sleeve 85 and a nut 88 on the upper end 89 of the stem 84. The air supply from the pipe 29ᵇ communicates with either of the annular ports 90 or 91 surrounding the body of the valve 87, according to the position of the latter, the said ports being separated by a packing ring 92. As valve body 87 descends the ring 92 passes pipe 29 thereby permitting air from control valve 25 to enter port 90 and pass through and out 29 to 30 thus putting the unloader valve into operation when valve 81 is off the seat 84. 92ª holds the air from going out of the exhaust 90ª in this position. On the other hand, when the operator closes the valve 81, this moves the valve body 87 upwardly and brings the port 91 into register with the pipe 29, and the air from said port is discharged through a pipe 93 to operate a whistle 94 and thereby notify the attendant that the liquid system is cut off from the presses due to 81 being on seat 84, and at the same time registers 29ᵇ with exhaust port 90ª and permits air from 25 to exhaust through 29ᵇ and 90ª to atmosphere and shuts off any further supply from the air control valve entering through 29ᵇ to 29 even though the air control valve is in the operating position. Thus an operator closing the line valve by operating 82 will cause the pump to unload under any condition. The valve body is provided with a second packing ring 95. Should any air escape around such ring when the valve is in the open position, it will be vented through the port 96 in the valve casing, longitudinally spaced from the whistle connection, without blowing the whistle. 97 denotes a port in the valve casing 88 through which any liquid passing the packing 85ª may escape.

*Unloader supply valve.*

The casing for this valve is indicated diagrammatically at 6 in Fig. 1 of the drawing. The details of this casing are shown in Figs. 8-11 inclusive. The pipe 5 communicates with the inlet connection 97 and with a chamber formed within said casing by three of the side walls thereof, a partition 98 formed with one of such walls, and a partition 99 uniting two opposed side walls. From one of the side walls of the chamber 100 there extends a connection 101 by means of which the casing is secured to the valve casing 19, said connection registering with the port 59. Between the partition 99 and the casing wall 102 there is formed a chamber 103 leading to the connection 104 with which the pipe 7 communicates. In the partition 99 are mounted a plurality of check valves 105 which open toward the chamber 103, the wall 102 being provided with removable plugs 106 permitting access to the said check valves, respectively. These check valves are normally held in operative relation to their seats by means of the stop screws 107, threaded into the plug 106.

With this construction and arrangement of parts, the liquid from the pump 4 may be supplied either to the press operating side of the system or to the unloader, dependent upon the position of the unloader valve 52. The check valves serve to retain the liquid under pressure in the high pressure side of the system should the pump be stopped or any breakage occur between the pump and the casing 6.

In Fig. 12, there is shown a two-way valve comprising a casing 29ª which may be conveniently located at the starting switch board or other starting station for the pump. This casing is interposed in the air line pipe 29 and is provided with an ordinary rotary valve body 109 having a port 110, the casing being provided with a port 111 registering with the delivery portion of the pipe 29 and with a venting port 112. By rotating the valve body in one direction, the air from the valve 25 is shut off and air from cylinder 30 is vented to the atmosphere thereby to release the pressure on the unloader until the pump is fully running; the unloader valve 52 being open, the pump will deliver liquid through the unloader into the tank. As soon as the pump is well under way, the valve body is rotated to re-establish communication between the air control valve and the unloader, enabling the pressure in the air line to seat the unloader valve, whereupon the pump delivers the liquid to the high pressure side or press-operating side of the system.

With the various parts arranged as described and illustrated herein, it is believed that the operation will be evident. The operator opens the valve 8 and rotates valve 109 to shut off the air from valve 25, thereby partially establishing communication between the pipe 29 and the unloader cylinder and also opening the supply from the pump to the press or presses supplied thereby. After the pump is fully running, he rotates the valve 109, to fully establish communication between the air pressure line and the unloader. Should the liquid supplied by the pump or pumps be in excess of that required by the presses, the accumulator 12 will be elevated, thereby relieving the air pressure beneath the unloader piston or pistons and enabling the pump or pumps to discharge temporarily through the waste pipes 18. As the supply of operating liquid for the presses becomes normal, the falling of the accumulator closes the unloader valves progressively, and the pumps deliver the liquid to their presses. Should the operator fail to open the line valve at 8, the warning whistle 94 will be sounded and the operator will thereupon open the valve, thereby enabling the pump to fill the system and the unloader to exercise its control over the same.

Having thus described my invention, what I claim is:

1. In a system of the character described, the combination with a conduit, of means for forcing fluid thereinto under pressure, a device for temporarily diverting from said conduit a part of the fluid forced thereinto, fluid control means for operating said device, said device being operable to divert said fluid from said conduit by a diminution of pressure in said fluid control.

2. In a system of the character described, the combination of a conduit and means for forcing thereinto fluid under pressure, a device for relieving the pressure in a portion of said conduit, means for conducting a second fluid under pressure to said device, and connections whereby a diminution of pressure of said second fluid thus conducted to said device will render the same operative.

3. In a system of the character described, the combination of a liquid conduit and means for forcing liquid under pressure thereinto, a pressure relieving device for a portion of said conduit, and means for supplying a gaseous fluid under pressure to said device.

4. In a system of the character described, the combination of a liquid conduit and means for continuously forcing liquid under pressure thereinto, a device for temporarily diverting from said conduit a part of the fluid forced thereinto, and means for supplying a gaseous fluid under pressure to said device.

5. In a system of the character described, the combination of a conduit and means for forcing liquid thereinto under pressure, an unloader valve communicating with said conduit, a waste communicating with said valve, a piston connected with said valve and adapted to close the same through the pressure of a fluid operating thereupon, means for conducting a second fluid under pressure to said piston, and means controlled by the accumulation of fluid within said conduit for varying the pressure fluid supplied to said piston.

6. In a system of the character described, the combination of a conduit and means for forcing fluid thereinto under pressure, an unloader valve communicating with said conduit and with a waste, a pressure motor, connections between said motor and said valve for opening the latter by a diminution of pressure on said motor, means for conducting fluid under pressure to said motor, and means controlled by variations of the fluid supply in said conduit for varying the pressure of the fluid supplied to said motor.

7. In a system of the character described, the combination with a conduit, of means for forcing fluid thereinto under pressure, a pressure relieving device interposed in said conduit and adapted to relieve the pressure in said conduit on one side of said device and pneumatic means controlled by the accumulation of fluid in the unrelieved side of said conduit for operating said device.

8. In a system of the character described, the combination of a conduit and means for forcing fluid under pressure thereinto, a pressure relieving device for said conduit, means for conducting fluid under pressure to said device, connections whereby the said device will be operated by a diminution in pressure of the operating fluid therefor, an accumulator adapted to be operated by variations in pressure in said conduit, means for controlling the supply of pressure fluid, to said device, and connections between said accumulator and such supply controlling device whereby the pressure of the fluid supplied to the said device will vary inversely with the pressure of the fluid operating said accumulator.

9. In a system of the character described, the combination of a conduit and means for forcing thereinto liquid under pressure, an unloader valve connected with said conduit and with a waste outlet, a piston and connections between said piston and said valve for closing the latter by the movement of said piston under the influence of fluid pressure, a conduit for supplying fluid under pressure to said piston, valve mechanism in the last mentioned conduit adapted by its movement to vary the pressure of the fluid therein, an accumulator in the first mentioned conduit, connections between said accumulator and said valve mechanism for controlling the pressure of the fluid supplied through the second conduit inversely to the pressure of the fluid operating said accumulator, an additional valve mechanism for cutting off the supply of liquid under pressure from the portion of the first conduit leading to the accumulator and the supply of fluid under pressure to said piston, an alarm signal, and connections between the last mentioned valve mechanism and said alarm signal.

10. In a system of the character described, the combination of a conduit and means for forcing thereinto liquid under pressure, an unloader valve connected with said conduit and with a waste outlet, a piston, and connections between said piston and said valve for closing the latter by the movement of said piston under the influence of fluid pressure, a conduit for supplying fluid under pressure to said piston, valve mechanism in the last mentioned conduit adapted by its movement to vary the pressure of fluid therein, an accumulator in the first mentioned conduit, connections between said accumulator and said valve mechanism for controlling the pressure of the fluid supplied through the second conduit inversely to the liquid supply within the portion of the first conduit including said accumulator, and an additional valve mechanism for cutting off the supply of liquid under pressure from the portion of the first conduit leading to the accumulator and the supply of fluid under pressure to said piston.

11. An unloader comprising a valve casing having an annular seat and a bore including said seat, and a port communicating with said bore at one side of said seat and a port communicating with said bore at the opposite side of said seat, a valve within said bore and past which the liquid conducted through the first mentioned port is adapted to circulate, a valve steadying stem projecting from said valve into said bore and extending through said seat, and a fluid pressure motor connected with said valve and adapted to open said valve by a diminution of the pressure in the fluid pressure system.

12. An unloader valve comprising a casing, a valve in said casing adapted to control the flow of fluid therethrough, a fluid pressure motor, an angle lever connected to said motor and to said valve, an adjustable support for said lever, and an indicating device carried by said support and cooperating with the arm of the lever which is connected to said motor.

13. An unloader valve comprising a casing, a valve in said casing adapted to control the flow of fluid therethrough, a piston, an angle lever connected to said piston and to said valve, an adjustable support for said lever, and an indicating device carried by said support and cooperating with the arm of the lever which is connected to said piston.

14. An unloader valve comprising a casing, a valve in said casing for controlling the supply of fluid therethrough, a support for said casing, standards carried by said support, a cylinder on said support, a supporting device adjustably mounted on said standards, a piston cooperating with said cylinder, a lever pivoted to said supporting device and connected to said piston and to said valve, and a stop on said device cooperating with said lever.

15. An unloader valve comprising a casing, a valve in said casing for controlling the supply of fluid therethrough, a cylinder, a piston cooperating with said cylinder, a lever connected to said piston, a toggle connecting said lever to said valve, and a stop cooperating with said lever.

16. A valve for a system of the character described comprising a casing having a seat, a rotary disk valve cooperating with said seat within said casing, the said seat being provided with a through port and with a port for conducting fluid to a point of use and the said disk valve being provided with a port extending therethrough and adapted to communicate with the second port and being provided with a port in its seat-engaging face registering with the through port and adapted to register with the other port in said valve seat, and connections for supplying fluid under pressure to said casing.

17. A valve for a system of the character described comprising a casing having a seat, a rotary disk valve co-operating with the said seat within said casing, the said seat being provided with a through port and with a plurality of ports for conducting fluid to various points of use, the said disk valve being provided with an elongated port extending therethrough and adapted to communicate with the plurality of ports progressively and being provided with an elongated port in its seat-engaging face registering with the through port and adapted to register progressively with the other ports in said valve seat, and connections for supplying fluid under pressure to said casing.

18. A valve for a system of the character described comprising a casing having an annular seat, a rotary disk valve cooperating with said seat within said casing, the said seat being provided with a pair of through ports and with a plurality of ports for conducting fluid to various points of distributing use, the said disk valve being provided with a pair of segmental ports extending therethrough and adapted to communicate with the distributing ports respectively, and being provided with a pair of segmental ports in its seat-facing portion one of which registers with one of said through ports and is adapted to register progressively with the distributing ports in said valve seat, connections for supplying fluid under pressure to said casing, the said valve having a segmental slot providing stops at the opposite ends thereof, and an arm connected to the valve and extending into said slot and cooperating with said stops.

19. A valve for a system of the character described comprising a casing having a seat, a rotary disk valve cooperating with said seat within said casing, the said seat being provided with a through port and with a distributing port for conducting fluid to a point of use, the said disk valve being provided with an elongated port extending therethrough and adapted to communicate with the distributing port and being provided with a segmental port in its seat-facing portion registering with the through port and adapted to register with the distributing port in said valve seat, connections for supplying fluid under pressure to said casing, and means for balancing the pressure of the valve disk on its seat.

20. A valve for a system of the character described comprising a casing having an inlet and an outlet connection for liquid under pressure and an inlet connection and a pair of longitudinally spaced outlet connections for a second fluid, a valve in said casing controlling the supply of fluid through the first two connections, a sliding valve in said casing connected to the first mentioned valve and having a pair of longitudinally spaced annular ports, one of said annular ports adapted to establish communication between the inlet and outlet connections for the second fluid and the other annular port adapted to establish communication between such inlet connection and the other outlet connection, and an alarm signal on such other outlet connection.

21. A valve for a system of the character described comprising a casing having an inlet and an outlet connection for a fluid under pressure and an inlet connection for a second fluid under pressure, a valve in said casing controlling the supply of fluid through the first two connections, a sliding valve in said casing connected to the first mentioned valve and having a pair of longitudinally spaced annular ports, the said casing having an inlet connection and an outlet connection longitudinally spaced from such inlet connection, both such connections being arranged to communicate with one of said annular ports, the said casing also having an alarm signal connection adapted to communicate with the other annular port.

22. A valve for a system of the character described comprising a casing having an inlet and an outlet connection for a fluid under pressure and an inlet connection for a second fluid under pressure and a pair of longitudinally spaced outlet connections, a valve in said casing controlling the supply of fluid through the first two connections, a sliding valve in said casing connected to the first mentioned valve and having a pair of longitudinally spaced annular ports one of which is adapted to establish communication between the inlet connection and one of the outlet connections and the other of which is adapted to establish communication between such inlet connection and the other outlet connection, an alarm signal for such other connection, a venting connection adapted to register with the second annular port and longitudinally spaced from the signal connection, the said casing being also provided with an outlet for the escape of liquid which may accumulate therein beyond the chamber containing the first valve.

In testimony whereof, I hereunto affix my signature.

WILLIAM E. IRISH.